US012600059B2

(12) United States Patent
Weaver

(10) Patent No.: US 12,600,059 B2
(45) Date of Patent: Apr. 14, 2026

(54) MIXING ACCESSORY FOR A DRUM OF A CONCRETE MIXER, THE DRUM HAVING HELICAL FINS WITH FINGERS EXTENDING RADIALLY THEREFROM

(71) Applicant: George B. Weaver, Almond, NY (US)

(72) Inventor: George B. Weaver, Almond, NY (US)

( * ) Notice: Subject to any disclaimer, the term of this patent is extended or adjusted under 35 U.S.C. 154(b) by 505 days.

(21) Appl. No.: 18/184,047

(22) Filed: Mar. 15, 2023

(65) Prior Publication Data

US 2024/0308106 A1 Sep. 19, 2024

(51) Int. Cl.
*B28C 5/42* (2006.01)

(52) U.S. Cl.
CPC .......... *B28C 5/4268* (2013.01); *B28C 5/4272* (2013.01)

(58) Field of Classification Search
CPC . B60S 1/64; B08B 9/00; B08B 9/0813; B08B 9/093; B28C 5/4203; B28C 7/00; B28C 5/4268; B28C 5/4272; B28C 5/2054; B60P 3/16; B01F 35/145; B01F 35/1452; B01F 29/63
USPC ...................................................... 366/53–59
See application file for complete search history.

(56) References Cited

U.S. PATENT DOCUMENTS 1,890,002 A * 12/1932 Paris ..................... B28C 5/2054 366/57
2,618,472 A 11/1952 Castendyck
4,188,127 A * 2/1980 Pawley ................. B28C 5/4268 29/889.7
4,268,174 A 5/1981 Falardeau
5,515,620 A * 5/1996 Butler ................. F26B 11/0477 432/118
6,149,291 A 11/2000 Christenson
7,546,843 B2 6/2009 Boos et al.
9,233,482 B2 1/2016 Wallgren
9,481,107 B2 * 11/2016 Meldahl ................ B28C 5/1862
2013/0107656 A1 * 5/2013 Datema ................. B28C 5/4268 366/59
2024/0308106 A1 * 9/2024 Weaver ................. B28C 5/4272

FOREIGN PATENT DOCUMENTS

AU 2020286237 A1 7/2021
CN 108544660 A 9/2018
CN 111745820 A 10/2020
CN 113858435 A 12/2021
GB 1385315 A * 2/1975 ............ B01F 9/0034
JP 10071328 A * 3/1998

* cited by examiner

*Primary Examiner* — Charles Cooley
(74) *Attorney, Agent, or Firm* — Simpson & Simpson, PLLC

(57) ABSTRACT

A concrete mixing accessory for a drum of a concrete mixer, the drum having an inner surface and an outer surface, the drum including a first helical fin extended from the inner surface and extending from a first end and a second end of the drum, the drum including a second helical fin extending from the inner surface and extending from the first end and the second end of the drum, the accessory comprising: a first set of fingers extending radially inward from an edge of the first helical fin; and, a second set of fingers extending radially inward from an edge of the second helical fin, wherein the first set of fingers is arranged diametrically opposite the second set of fingers.

12 Claims, 5 Drawing Sheets

MIXING ACCESSORY FOR A DRUM OF A CONCRETE MIXER, THE DRUM HAVING HELICAL FINS WITH FINGERS EXTENDING RADIALLY THEREFROM

FIELD

The present invention relates to an accessory for a mixing drum, and, more specifically, to an accessory for the drum, the accessory including at least one set of finger extensions positioned within the mixing drum of a transit mixer.

BACKGROUND

Concrete is typically transported using a concrete truck, also known in the art as an agitator truck, a cement truck, a concrete mixer truck, a mixer, and/or a transit mixer. These trucks carry ready-mixed concrete to specific locations, e.g., a construction site. Typically, the trucks are built on a regular truck chassis, i.e., the mixing drum and mechanisms are supplied by a specialist manufacturer, where the mixing drum is then attached to the truck chassis.

Traditionally, the mechanisms include means that afford rotation of the mixing drum on the truck chassis, which prevents the concrete from setting during transit. These means can be mechanical, hydraulic, electric, etc. The drums typically include "fins" or "blades" secured to an internal surface of the mixing drums. The fins or blade stir or guide the material therein, e.g., rotating the mixing drum in a first direction pushes the mixture further into the drum, known as charging, whereas rotating the mixing drum in a second direction pulls the concrete to an outlet or mouth of the mixing drum for discharge therefrom.

These trucks also include a chute, arranged proximate the outlet or mouth of the mixing drum. The chute allows concrete to be diverted from the outlet or mouth of the mixing drum—typically the chutes are rotatably attached allowing at least 180° of movement to further control the pouring of concrete from the chute post-discharge from the mouth of the mixing drum.

When concrete is being mixed within the mixing drum, it is common for "balls" or "lumps" of unmixed concrete to form. Typically, these "balls" or "lumps" of unmixed concrete form within the mixing drum. When these "balls" or "lumps" are discharged from the mixing drum and poured down the chute, they must be manually broken up and/or mixed with the rest of the mixture—adding additional manual effort and time to the particular concrete pour.

In an attempt to prevent the formation of "balls" or "lumps" of unmixed concrete within a mixing drum, U.S. Pat. No. 9,233,482 discloses a batch mixer for mixing concrete having a plurality of paddles fixed within and to a drum of the batch mixer. The mixer generally comprises a drum having an inlet end and an outlet end. A first end wall spans the inlet end and includes an opening therein. A second end wall spans the outlet end and includes a discharge opening therein. Located within the drum, proximate the outlet end are discharge shovels, which are fixed to an internal surface of the drum. Longitudinal slides are fixed within the drum, preferably on the internal surface of the drum and an internal surface of the first end wall. Slidably attached to each of the longitudinal sliders are paddles. Each of the paddles includes intermediate paddles, which substantially resemble a plurality of teeth which are spaced apart, or a rake-like configuration extending from each paddle. While the '482 patent does attempt to solve the issue of "balls" or "lumps" of unmixed concrete in a mixing drum, it purports to solve the problem with a rather complex arrangement that would require extensive retrofitting of an existing mixing drum.

Thus, there is a long felt need for a simple and effective accessory that can attach to the fins within a mixing drum of a concrete truck which is arranged to break up "balls" or "lumps" of unmixed concrete upon rotation of the mixing drum—thereby preventing the aforementioned manual effort required to break up the "balls" or "lumps" of unmixed concrete that exit a chute of the mixing drum.

SUMMARY

According to aspects illustrated herein, the present invention provides for a mixing accessory for a drum of a concrete mixer, the drum having an inner surface and an outer surface, the drum including a first helical fin extended from the inner surface and extending from a first end and a second end of the drum, the drum including a second helical fin extending from the inner surface and extending from the first end and the second end of the drum, the accessory comprising: a first set of fingers extending radially inward from an edge of the first helical fin; and, a second set of fingers extending radially inward from an edge of the second helical fin, wherein the first set of fingers is arranged diametrically opposite the second set of fingers.

In some embodiments, the present invention generally comprises a mixing accessory for a drum of a concrete mixer, the drum having an inner surface and an outer surface, the drum including a first helical fin extended from the inner surface and extending from a first end and a second end of the drum, the drum including a second helical fin extending from the inner surface and extending from the first end and the second end of the drum, the accessory comprising: a first support fixedly secured to an edge of one of: the first helical fin; and, the second helical fin, a first set of fingers fixedly secured to the first support and arranged to extend in a direction towards a central axis of the drum.

In other configurations, the present invention generally comprises a mixing accessory for a drum of a concrete mixer, the drum having an inner surface and an outer surface, the drum including a first helical fin extended from the inner surface and extending from a first end and a second end of the drum, the drum including a second helical fin extending from the inner surface and extending from the first end and the second end of the drum, the accessory comprising a first support fixedly secured to an edge of the first helical fin, a first set of fingers fixedly secured to the first support and arranged to extend in a direction towards a central axis of the drum, a second support fixedly secured to an edge of the second helical fin, and a second set of fingers fixedly secured to the second support and arranged to extend in a direction towards a central axis of the drum.

In some arrangements, each finger of the first set of fingers and the second set of fingers comprise a first end, and a second end extending away from one of the helical fins in a direction towards a central axis of the drum, the fingers are affixed to one of the helical fins proximate the first end, wherein each finger of the first set of fingers and the second set of fingers may further comprises a bend proximate the second end of the finger, wherein the bend may be arranged in direction towards the first end of the drum. The bend may be arranged in a hook-like configuration.

In further arrangements, each finger of the first set of fingers and the second set of fingers may not comprise a bend, or each finger of one set of fingers may comprise a bend and each finger of the other set of fingers may not comprise a bend.

In alternative arrangements, fingers of either the first set of fingers and/or the second set of fingers may have alternating bent and non-bent configurations.

In other embodiments, each of the first set and the second set of fingers may comprise seven individual fingers. In alternative embodiments, each of the first set and the second set of fingers may comprise at least three individual fingers.

In even further embodiments, each of the fingers of the first set of fingers and the second set of fingers may be directly attached to the first and second helical fins.

In alternative arrangements, each of the fingers of the first set of fingers and the second set of fingers may be affixed to and arranged to extend from an edge of each of the first and second helical fins.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
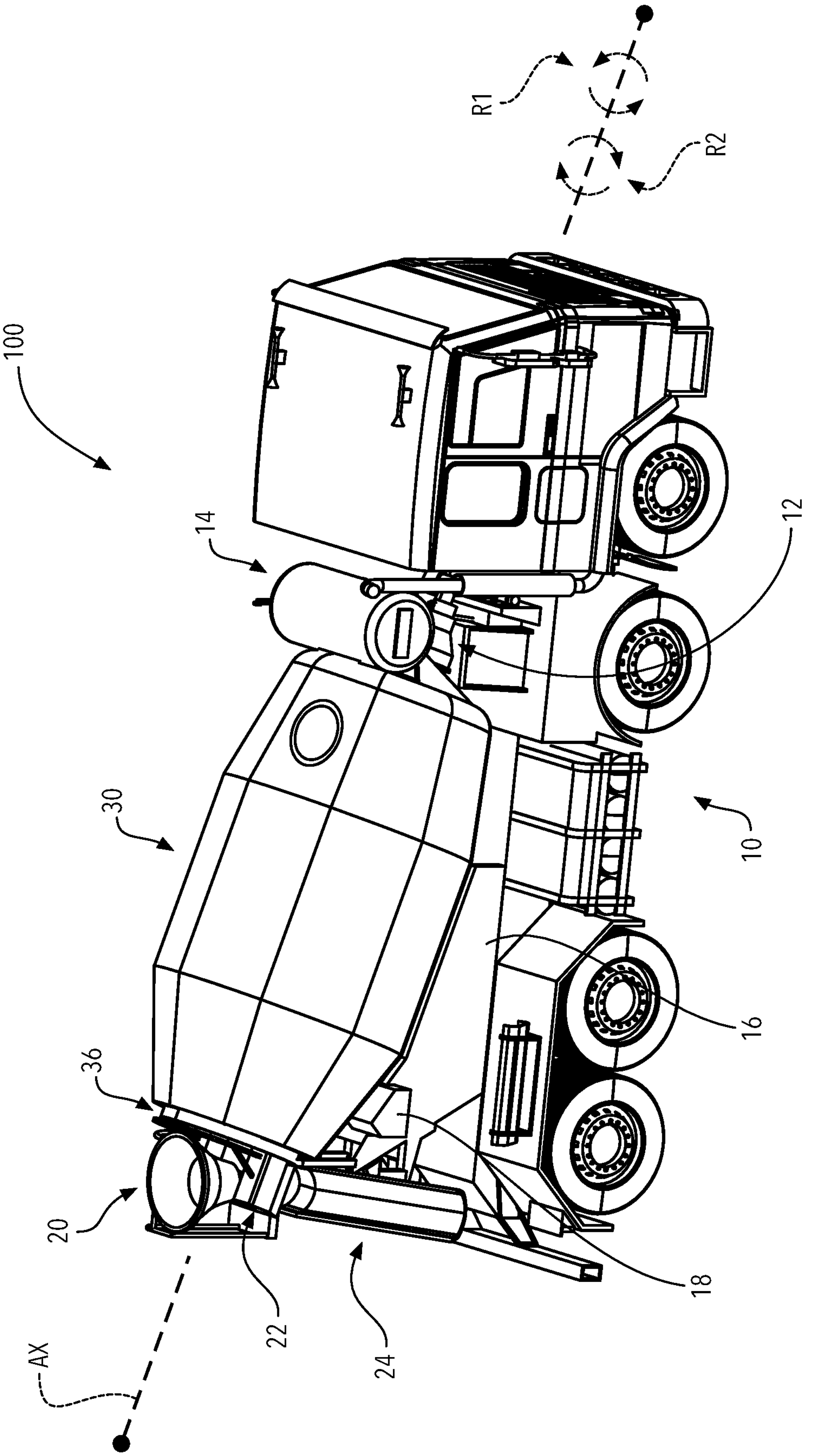
FIG. 1 generally illustrates an embodiment of a transit mixer.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims. As such, those in the art will understand that in any suitable material, now known or hereafter developed, may be used in forming the present invention described herein.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" or "one of:" is used herein.

It should be noted that the terms "fins" and "blades" are intended to be substantially synonymous. The same should be taken in consideration of the terms "cement" and "concrete". Additionally, the term "material" is intended to mean either cement, concrete, any other material or substance that would require mixing.

Transit Mixer

Adverting now to the drawings, FIG. 1 generally illustrates an embodiment of transit mixer 100. Transit mixer 100 includes chassis 10, hydraulic system 12, water system 14, stander 16, operating equipment 18, feed hopper 20, outlet hopper 22, chute 24, and mixing drum 30 having mouth 36.

Generally, chassis 10 comprises a traditional truck chassis that is then retrofitted with the aforementioned components to form transit mixer 100. Alternatively, chassis 10 could also be a specialty-made chassis. Chassis 10 realizes the transport functionality of transit mixer 100.

Hydraulic system 12 is arranged to receive power from the engine of chassis 10, whereas traditionally hydraulic system 12 utilizes a hydraulic pump to output mechanical energy to rotate mixing drum 30. For example, hydraulic system 12 rotates mixing drum 30 about central axis AX (of mixing drum 30) in rotational directions R1 and R2. It should be appreciated that other systems may be employed to rotate mixing drum 30.

Stander 16 is a specialty frame that includes the necessary means to support mixing drum 30 on chassis 10, such that mixing drum 30 may be rotated. In some embodiments, a support roller that substantially surrounds an external surface of mixing drum 30 may be affixed to stander 16, whereas the support roller assists in the rotation of mixing drum 30.

Operating equipment 18 may include a plurality of controls that may control the rotation of mixing drum 30, chute 24, and/or other components. It should be noted that additional operating equipment and or controls may be present on transit mixer 100.

Water system 14 typically includes a reservoir and discharge means. Water system 14 may be used to add water to concrete within mixing drum 30 to prevent setting during extended periods of rest, or can be used on feed hopper 20, outlet hopper 22, and/or chute 24 for cleaning purposes.

Feed hopper 20 is in fluid connection with mouth 36 of mixing drum 30 and is primarily arranged as an inlet for inserting material (e.g., concrete mix, water, cement mix, and/or concrete/cement additives, other materials/additives, etc.) into mixing drum 30. Feed hopper 20 may include hydraulics or mechanical means to assist in feeding material into mixing drum. Outlet hopper 22 is in fluid connection with mouth 36 of mixing drum 30 and chute 24 is fluid connection with outlet hopper 22. It should be noted that "fluid connection" means that material may flow from one component to another and may imply a sealed connection (i.e., isolated from the outside environment) or a non-sealed connection (i.e., exposed to the outside environment). Chute 24 typically is rotatably attached to outlet hopper 22 such that it may be rotated at least 180° (either manually or under power) allowing mixed concrete to be spread to different areas proximate an end or outlet of chute 24.

It should be appreciated that the aforementioned description is merely exemplary of one possible embodiment of transit mixer 100 and is primarily for illustrative purposes to put the present invention into context.

Mixing Accessory

Figure 2A:
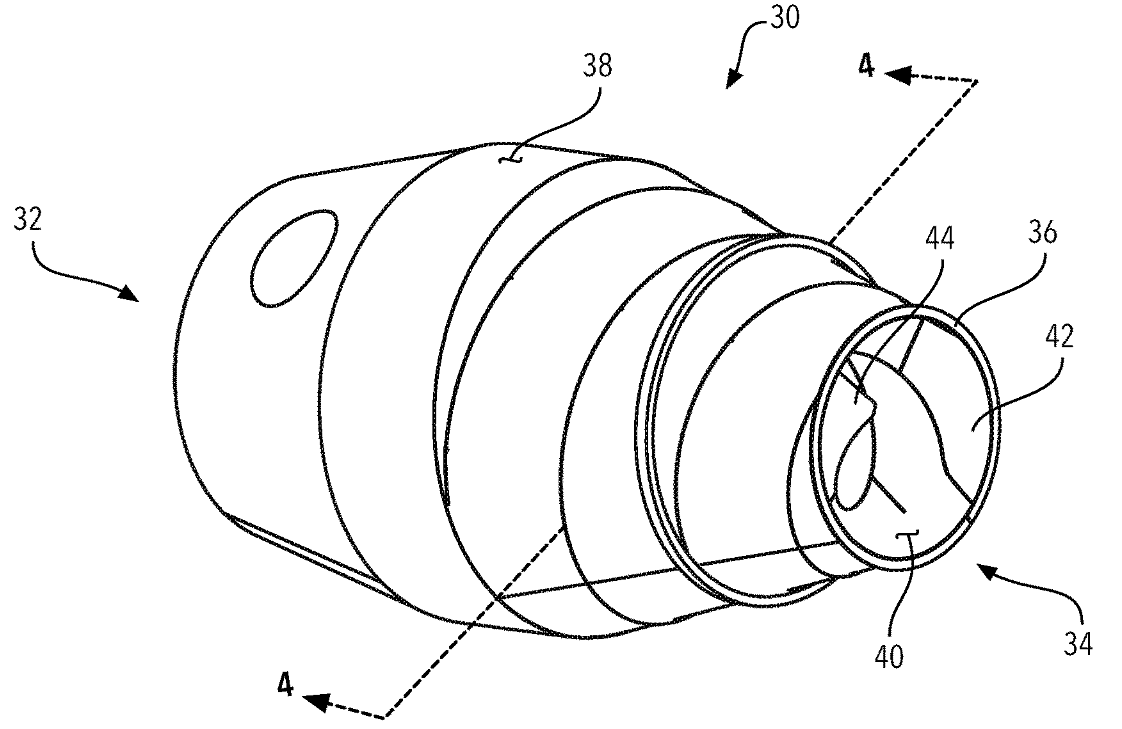
FIG. 2A generally illustrates a perspective view of a mixing drum of the transit mixer shown in FIG. 1.
Figure 2B:
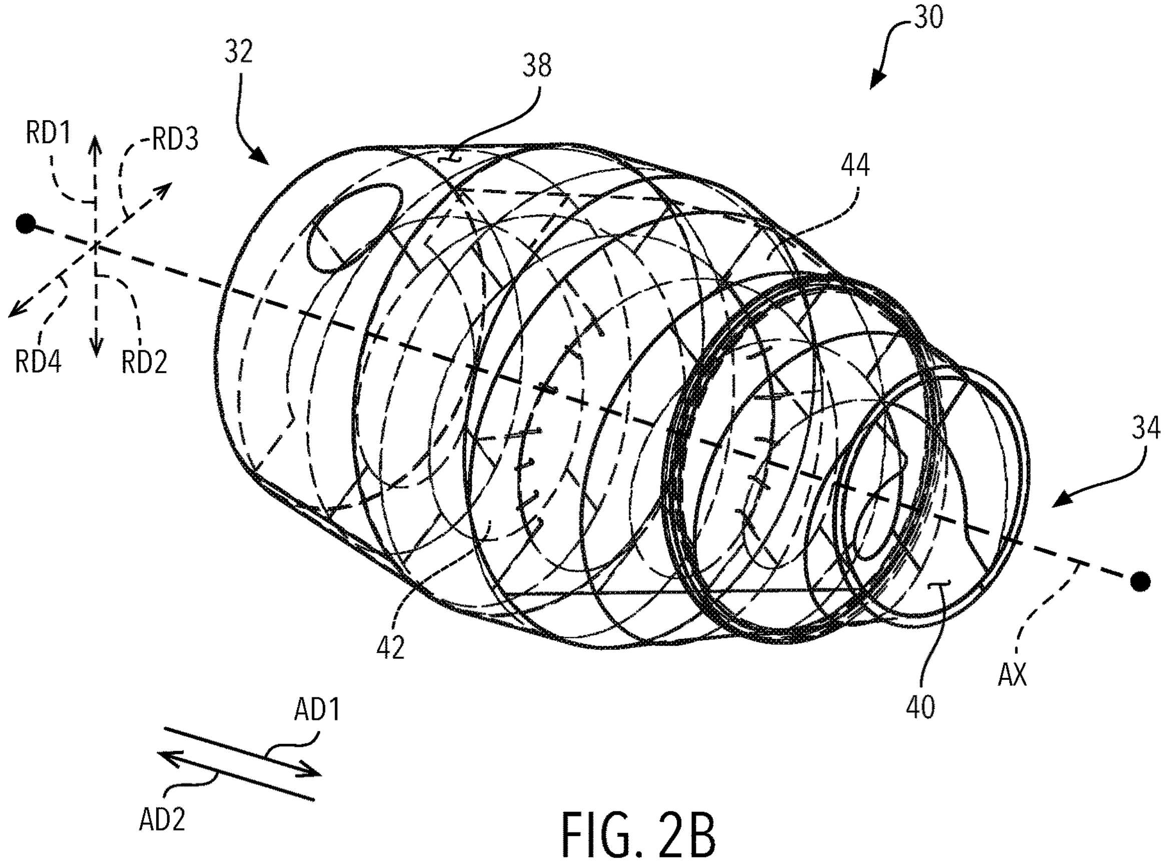
FIG. 2B generally illustrates a skeleton perspective view of the mixing drum shown in FIG. 2A.
Figure 3:
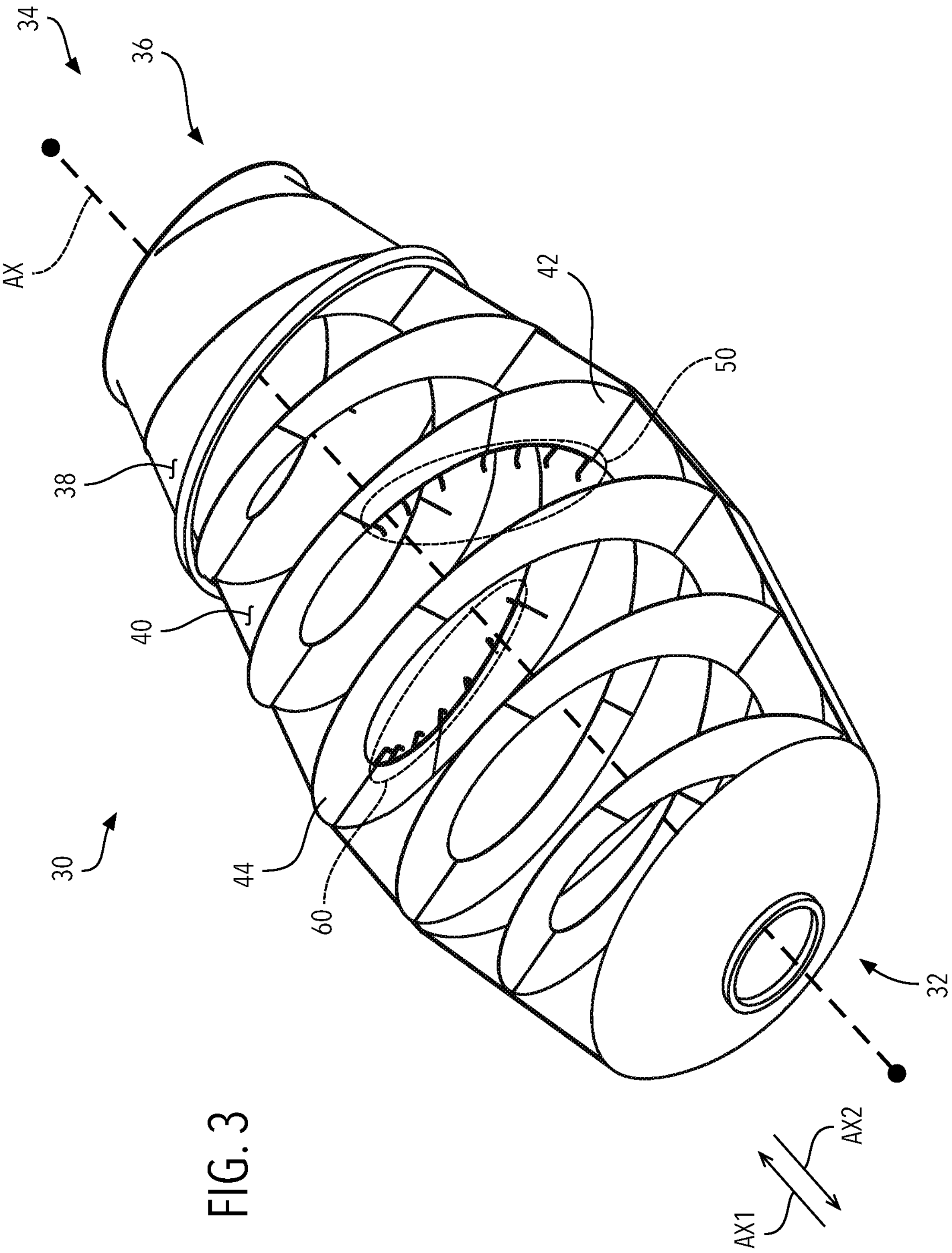
FIG. 3 generally illustrates a rear perspective view of the mixing drum shown in FIG. 2A with outer portions of the mixing drum cut-away.
Figure 4:
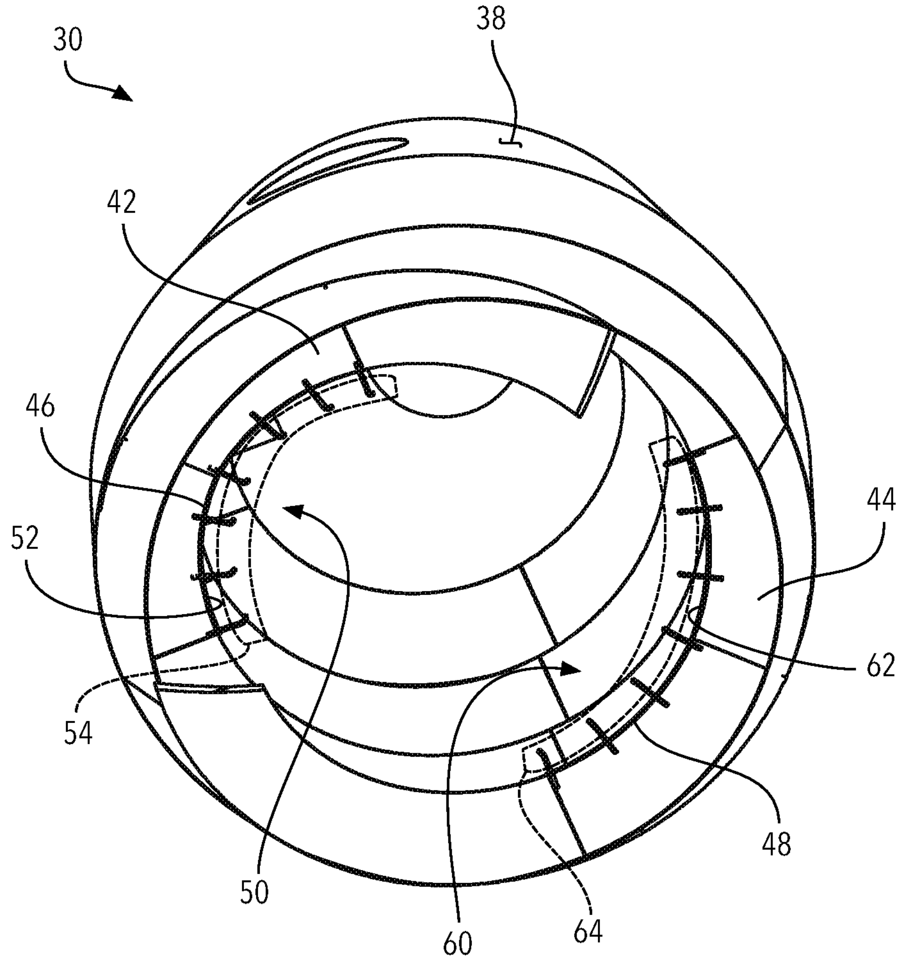
FIG. 4 generally illustrates a cross-sectional view taken along line 4-4 in FIG. 2A; and, FIGS. 5A and 5B generally illustrate the accessory within the drum in FIG. 2A.

The following description should be taken in consideration of FIGS. 2A through 5. FIG. 2A generally illustrates a perspective view of mixing drum 30 of transit mixer 100 and FIG. 2B generally illustrates a skeleton perspective view of the same. FIG. 3 generally shows a rear perspective view of mixing drum 30 with outer portions of the mixing drum cut-away. FIG. 4 generally illustrates a cross-sectional view of mixing drum 30 taken generally along line 4-4 in FIG. 2A. FIGS. 5A and 5B generally illustrate the concrete mixing accessory of the present invention removed from mixing drum 30.

Figure 5A:
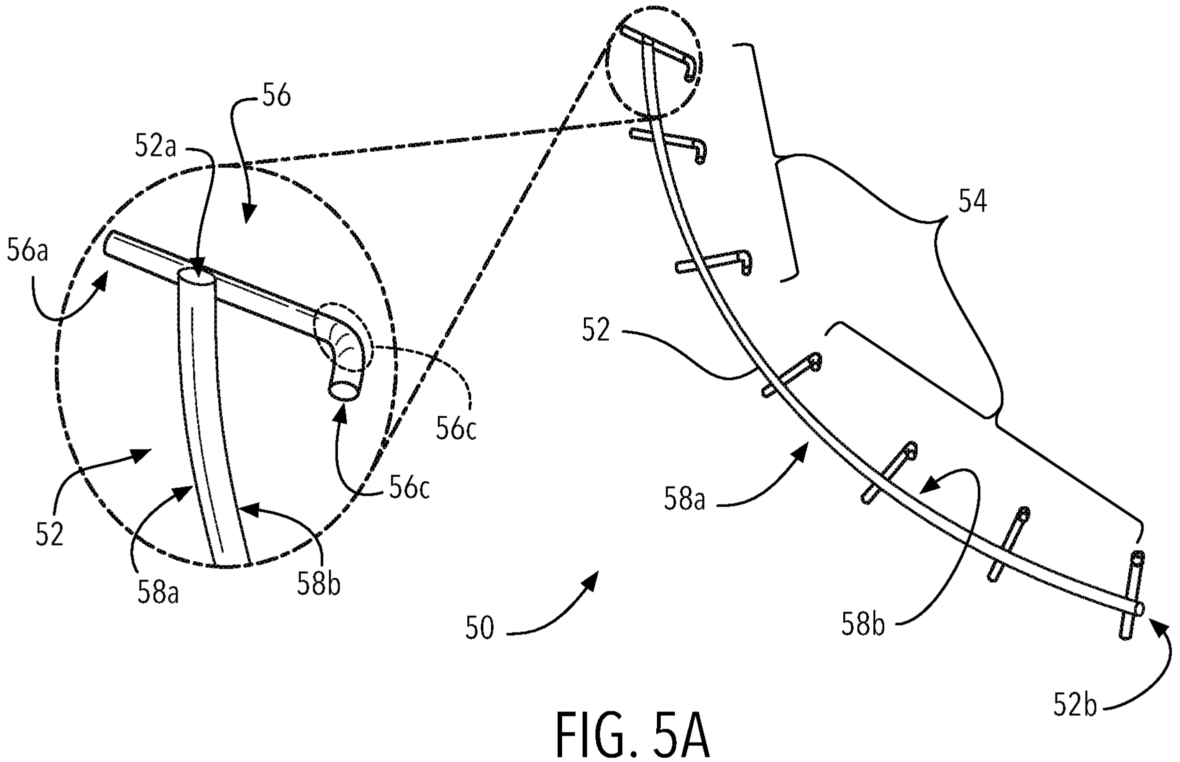
Figure 5B:
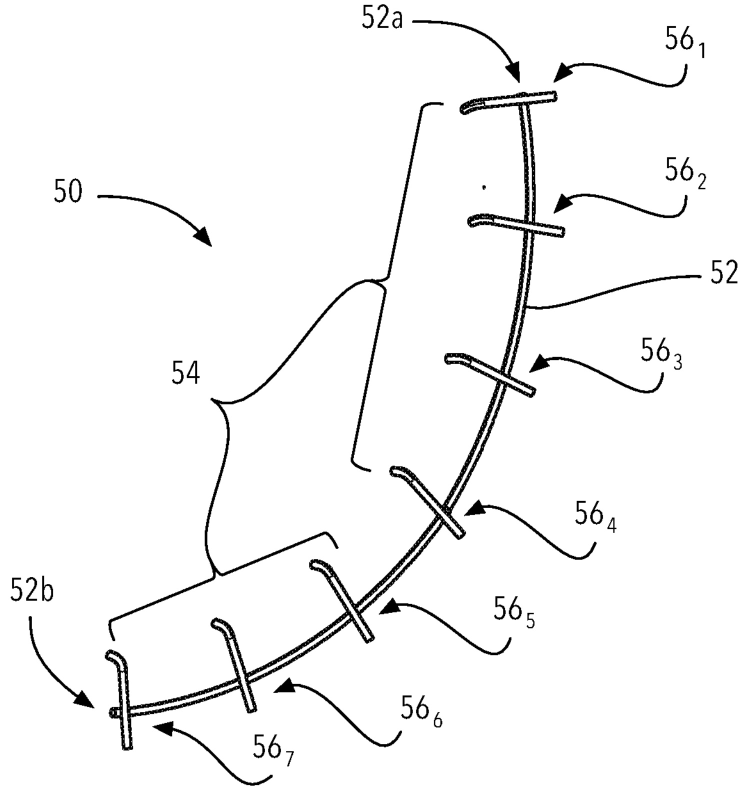

The concrete mixing accessory, shown isolated in FIGS. 5A and 5B, of the present invention is arranged to be secured within mixing drum 30. Mixing drum 30 generally includes first end 32 and second end 34, where mouth 36 of mixing drum 30 is an outlet to the inside of mixing drum 30 and is arranged at second end 34. Mixing drum 30 has outer surface 38 and inner surface 40. First helical fin 42 and second helical fin 44 extend from internal surface 40, and span inner surface 40 from first end 32 to second end 34, preferably terminating at an edge of mouth 36. Fins 42 and 44 are arranged to substantially spiral around central axis AX of mixing drum 30, whereas edge 46 of fin 42 and edge 48 of fin 44 are arranged in a direction towards central axis AX, in other words, edges 46 and 48 are arranged proximally on their respective fins in relation to central axis AX.

The concrete mixing accessory of the present invention generally includes at least one of first set of fingers 50 and second set of fingers 60. Preferably, the concrete mixing accessory of the present invention includes both of first set of fingers 50 and second set of fingers 60. However, it should be noted that, in alternative embodiments, the concrete mixing accessory of the present invention could include both of first set of fingers 50 and second set of fingers 60 in addition to a third set of fingers, a fourth set of fingers, etc.

Generally, first set of fingers 50 includes first support 52 and first plurality of fingers 54 attached thereon and extending therefrom, whereas second set of fingers 60 includes second support 62 and second plurality of fingers 64 attached thereon and extending therefrom. In a preferred embodiment, first support 52 is affixed to edge 46 of fin 42 and second support 62 is affixed to edge 48 of fin 44. In a preferred embodiment each finger of plurality of fingers 54 and 64 are fixedly secure to both supports 52 and 62 in addition to fins 42 and 44.

Fins 42 and 44 may also be known in the art as "blades" or "spiral blades" and are core components of transit mixer 100, the fins of mixing drum 30 have a direct impact on the mixing performance and discharge performance of mixing drum 30. Particularly, fins 42 and 44, by rotation of mixing drum 30, either pull material within mixing drum 30 to mouth 36, or push material within mixing drum 30 towards first end 32 of mixing drum 30. For example, rotating mixing drum 30, and thereby rotating fins 42 and 44 therein, about central axis AX in rotational direction R1 may push material within mixing drum 30 in a direction proximate first end 32 (i.e., "charging") and rotating mixing drum 30, and thereby rotating fins 42 and 44 therein, about central axis AX in rotational direction R2 may pull material within mixing drum 30 in a direction towards mouth 36 or second end 34 (i.e., "discharging"), or vice versa with respect to rotational directions R1 and R2.

FIGS. 5A and 5B generally illustrate first set of fingers 50 (removed from mixing drum 30). It should be noted that the following description of first set of fingers 50 also applies to second set of fingers 60. First support 52 generally includes first end 52*a*, second end 52*b*, distal end 58*a*, and proximal end 58*b*, whereas first support 52 is configured to have a shape that substantially matches the shape of an edge (46 and/or 48) of the fins (42 and/or 44) of mixing drum 30, such that first support 52 can be fixedly secured to the edge of the respective fin. This configuration generally takes an arcuate arrangement that may also include bends in axial directions AX1 and AX2—substantially matching the curvature and configuration of fins 42 and/or 44. As such, first support 52 is preferably arranged to be flushed affixed to the respective fin.

In a preferred embodiment, first plurality of fingers 54 are fixedly secured to first support 52 via welding, or other like permanent fastening means. In alternative configurations, each finger of first plurality of fingers 54 can be removably attached to either first support 52, one of fins 42 and 44, or a combination thereof. In a removably attached arrangements, threaded means, bolts, snap-fit, or other like removable fastening means may be employed.

First plurality of fingers 52 includes fingers $\mathbf{56_1}$-$\mathbf{56_7}$. Fingers $\mathbf{56_1}$-$\mathbf{56_7}$ have the same arrangement as finger 56, illustrated in the enlarged portion shown in FIG. 5A. Finger 56 includes first end 56*a*, second send 56*b*, and bend 56*c*. In a preferred embodiment, a section proximate first end 56*a* of finger 56 is fixed secured to first support 52, such that a portion of finger 56, proximate first end 56*a*, extends past distal end 58*a* of first support 52. In a preferred embodiment, the aforementioned portion of finger 56 that extends past distal end 58*a* of first support 52 is fixedly secured directly to the respective fin of mixing drum 30. Second end 56*b* of finger 56 is arranged to extend past proximal end 58*b* of first support 52. Bend 56*c* is arranged proximate second end 56*b* of finger 56. Bend 56*c* can take a variety of configurations, such as, but not limited to, a hook-like configuration or an angular bend with an obtuse angle. As such, bend 56*c* could configure second end 56*b* of finger 56 in a direction towards first end 32 of mixing drum 30 or in a direction towards second end 34 of mixing drum 30. With respect to fingers $\mathbf{56_1}$-$\mathbf{56_7}$ of first plurality of fingers 52, the bends could alternate directions between adjacent fingers, or be configured in the same direction.

The phrase "fixedly secured to the edge of the respective fin", recited supra and in reference to either first support 52 and/or second support 62, is intended to mean a plurality of different arrangements, such as, affixed proximate the edge of the respective fin, i.e., biased on either side of the fin in the direction of first end 32 of mixing drum 30 or in the direction of second end 34 of mixing drum 30, or affixed to and extending from the external perimeter of the edge of the respective fin, i.e., in a position closest to central axis AX (as generally illustrated in FIGS. 2B, 3, and 4). It should be noted that first and second supports 52 and 62 may be removably affixed to fins 42 and 44 via fastening means.

It should be appreciated that, in alternative embodiments, plurality of fingers 54 and 64 could be directly affixed to fins 42 and 44, i.e., first and second set of fingers 50 and 60 do not include first and second supports 52 and 62. Each finger of plurality of fingers 54 and 64 are preferably constructed of rebar, but alternatively, may be constructed of carbon steel, steel, stainless steel, other metals, composites, composite and metal combinations, polymers, plastics, etc. First and second supports 52 and 62 may be constructed of rebar, carbon steel, steel, stainless steel, other metals, composites, composite and metal combinations, polymers, plastics, etc.

It should be noted that the invention may have a number of individual fingers, where the specific number may be determined by the size of the drum, or depend upon the type of material mixed within mixing drum 30. For example, the number of individual fingers of a set of fingers may be three to twenty, allowing the mixing accessory to be employed in a variety of mixing drum configurations.

It should be noted that in some embodiments, the fingers and the supports, specifically where the fingers are secured thereon, there may be a spacer sandwiched between the finger and the support. The spacer could comprise approximately a half inch piece of rebar, or other like material. The spacer allows the finger to have a distance away from the spacer proximate the end of the finger having the bend. The distance, or size of the spacer may vary depending on the size of the mixing drum and/or the particular material within the mixing drum. It should also be appreciated that the end of the finger that is affixed to the fin may also have a spacer positioned between the finger and the fin. This helps create distance between the fin and the fingers, thereby creating a more claw-like configuration which assists in breaking up unmixed material within the mixing drum.

The following description should be taken in view of all of the aforementioned figures and respective descriptions. When material, such as a concrete mixture, is within mixing drum 30 on concrete mixing truck 100 and mixing drum 30 is being rotated, the material passes through first and second set of fingers 50 and 60, particularly when mixing drum 30 is being rotated in a manner where the material therein is being pulled to mouth 36 for discharge down outlet hopper 22 and chute 24. Plurality of fingers 54 and 64 thereby create a macro-sized mechanical filtration pass, where unmixed material will not pass through plurality of fingers 54 and 64 until it is properly mixed. The rotation of plurality of fingers 54 and 64, via mixing drum 30, in combination with the material being pulled in axial direction AX1 and/or AX2, via fins 42 and 44, will subsequently create physical contact with the unmixed material, thereby breaking up any unmixed material in the mixed material. This substantially eliminates "balls" or "lumps" of unmixed material from being discharged from mixing drum 30, creating an enhanced uniform mixture for discharge.

In summation, it should be appreciated by one having skill in the art that the present invention is not limited to mixing drums of transit mixers, that is, the present invention may be employed on standalone concrete mixing drums, either commercial or residential in use and/or scale. As such, the scale of the accessory, or accessories, of the present invention, are intended to be readily scalable to accommodate a plurality of different applications and the term "concrete mixer" should be considered in accordance therewith.

In view of the aforementioned disclosure of the present invention, it should be appreciated that described embodiments, specifically, "preferred embodiments", are not intended to be restrictive on the appending claims and should be interpreted as one any possible embodiment described, or shown, in the present disclosure. Further, one having skill in the art of the present invention will also appreciate the embodiments that are not explicitly recited, or shown, are intended within the scope of the appending claims.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Chassis
12 Hydraulic system
14 Water system
16 Stander
18 Operating equipment
20 Feed hopper
22 Outlet hopper
24 Chute
30 Mixing drum
32 First end
34 Second end
36 Mouth
38 Outer surface
40 Inner surface
42 First helical fin
44 Second helical fin
46 Edge of first helical fin

48 Edge of second helical fin
50 First set of fingers
52 First support
52*a* First end of first support
52*b* Second end of first support
54 First plurality of fingers
56 Finger
56*a* First end of finger
56*b* Second end of finger
56*c* Bend of finger
58*a* Distal end of first support
58*b* Proximal end of first support
$56_1$ First finger
$56_2$ Second Finger
$56_3$ Third finger
$56_4$ Fourth finger
$56_5$ Fifth finger
$56_6$ Sixth finger
$56_7$ Seventh finger
60 Second set of fingers
62 Second support
64 Second plurality of fingers
100 Transit mixer
AX Central axis
AX1 Axial direction
AX2 Axial direction
R1 Rotational direction
R2 Rotational direction
RD1 Radial direction
RD2 Radial direction
RD3 Radial direction
RD4 Radial direction

What is claimed is:

1. A mixing accessory for a drum of a concrete mixer, said drum having an inner surface and an outer surface, said drum including a first helical fin extended from said inner surface and extending from a first end and a second end of said drum, said drum including a second helical fin extending from said inner surface and extending from said first end and said second end of said drum, said accessory comprising:

a first set of fingers extending radially inward from an edge of said first helical fin; and, a second set of fingers extending radially inward from an edge of said second helical fin, wherein said first set of fingers is arranged diametrically opposite said second set of fingers, wherein each finger of said first set of fingers and said second set of fingers comprises:

a first end; and, a second end extending away from one of said helical fins in a direction towards a central axis of said drum, wherein said fingers are affixed to one of said helical fins proximate said first end of said finger, wherein each finger of said first set of fingers and said second set of fingers further comprises a bend proximate said second end of said finger.

2. The mixing accessory recited in claim 1, wherein each finger within said first set of fingers is equally spaced apart from each adjacent finger.

3. The mixing accessory recited in claim 1, wherein each finger within said second set of fingers is equally spaced apart from each adjacent finger.

4. The mixing accessory recited in claim 3, wherein said first set of fingers is arranged diametrically opposite said second set of fingers.

5. The mixing accessory recited in claim 1, wherein said first set of fingers comprises three to sixteen individual fingers and wherein said second set of fingers comprises three to sixteen individual fingers.

6. The mixing accessory recited in claim 1, wherein each finger of said first and second sets of fingers is comprised of rebar.

7. The mixing accessory recited in claim 1 further comprising:

a first support fixedly secured to said edge of said first helical fin, said first set of fingers fixedly secured to said first support; and, a second support fixedly secured to said edge of said second helical fin, said second set of fingers fixedly secured to said second support.

8. The mixing accessory recited in claim 1, wherein said bend is arranged in a direction towards said first end of said drum.

9. A mixing accessory for a drum of a concrete mixer, said drum having an inner surface and an outer surface, said drum including a first helical fin extended from said inner surface and extending from a first end and a second end of said drum, said drum including a second helical fin extending from said inner surface and extending from said first end and said second end of said drum, said accessory comprising:

a first support fixedly secured to an edge of one of:
said first helical fin; and,
said second helical fin; and, a first set of fingers fixedly secured to said first support and arranged to extend in a direction towards a central axis of said drum;

a first end of the first set of fingers; and, a second end of the first set of fingers extending away from one of said helical fins in a direction towards a central axis of said drum wherein each finger of said first set of fingers further comprises a bend proximate said second end of said finger.

10. The accessory recited in claim 9 further comprising:

a second support fixedly secured to said edge of one of:
said first helical fin; and,
said second helical fin; and, a second set of fingers fixedly secured to said second support and arranged to extend in a direction towards said central axis of said drum;

a first end of the second set of fingers; and, a second end of the second set of fingers extending away from one of said helical fins in a direction towards a central axis of said drum wherein each finger of said second set of fingers further comprises a bend proximate said second end of said finger.

11. The accessory recited in claim 10, wherein said first support is fixedly secured to said edge of said first helical fin and said second support is fixedly secured to said edge of said second helical fin.

12. A mixing accessory for a drum of a concrete mixer, said drum having an inner surface and an outer surface, said drum including a first helical fin extended from said inner surface and extending from a first end and a second end of said drum, said drum including a second helical fin extending from said inner surface and extending from said first end and said second end of said drum, said accessory comprising:

a first support fixedly secured to an edge of said first helical fin;

a first set of fingers fixedly secured to said first support and arranged to extend in a direction towards a central axis of said drum;

a second support fixedly secured to an edge of said second helical fin; and, a second set of fingers fixedly secured to said second support and arranged to extend in a direction towards said central axis of said drum, wherein each finger of said first set of fingers and said second set of fingers comprises:

a first end;

a second end extending away from one of said helical fins in a direction towards a central axis of said drum, wherein all said fingers are affixed to one of said helical fins proximate said first end of said finger; and, a bend proximate said second end of said finger, wherein said bend is arranged in a direction towards said first end of said drum, wherein said first set of fingers comprises at least three individual fingers and wherein said second set of fingers comprises at least three individual fingers.

* * * * *